United States Patent
Sugita et al.

(10) Patent No.: US 10,883,866 B2
(45) Date of Patent: Jan. 5, 2021

(54) PRESSURE-BASED FLOW RATE CONTROL DEVICE AND MALFUNCTION DETECTION METHOD THEREFOR

(71) Applicant: FUJIKIN INCORPORATED, Osaka (JP)

(72) Inventors: Katsuyuki Sugita, Osaka (JP); Kouji Nishino, Osaka (JP); Kaoru Hirata, Osaka (JP); Masahiko Takimoto, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 293 days.

(21) Appl. No.: 15/760,720

(22) PCT Filed: Sep. 15, 2016

(86) PCT No.: PCT/JP2016/004210
§ 371 (c)(1),
(2) Date: Mar. 16, 2018

(87) PCT Pub. No.: WO2017/051520
PCT Pub. Date: Mar. 30, 2017

(65) Prior Publication Data
US 2018/0283914 A1 Oct. 4, 2018

(30) Foreign Application Priority Data
Sep. 24, 2015 (JP) ................................. 2015-187523

(51) Int. Cl.
*G01F 1/50* (2006.01)
*G01F 1/36* (2006.01)
(Continued)

(52) U.S. Cl.
CPC .................. *G01F 1/50* (2013.01); *G01F 1/00* (2013.01); *G01F 1/36* (2013.01); *G01F 25/0007* (2013.01); *G05D 7/0635* (2013.01)

(58) Field of Classification Search
None
See application file for complete search history.

(56) References Cited

U.S. PATENT DOCUMENTS

2005/0211000 A1 9/2005 Suzuki
2009/0326719 A1* 12/2009 Nagase ............... F16K 37/0091
700/282
(Continued)

FOREIGN PATENT DOCUMENTS

JP 2004-138425 A 5/2004
JP 2005-274265 A 10/2005
(Continued)

OTHER PUBLICATIONS

International Search Report issued in PCT/JP2016/004210; dated Dec. 6, 2016.

*Primary Examiner* — Clayton E. LaBalle
*Assistant Examiner* — Dennis Hancock
(74) *Attorney, Agent, or Firm* — Studebaker & Brackett PC

(57) ABSTRACT

The pressure-type flow rate control device includes: a restriction part interposed in a flow channel; an upstream-side pressure sensor detecting a fluid pressure on the upstream side of the restriction part; a downstream-side pressure sensor detecting a fluid pressure on the downstream side of the restriction part; a flow control valve provided in the flow channel on the upstream side of the upstream-side pressure sensor; and computation control circuit controlling the flow control valve based on detected values of the upstream-side pressure sensor and the downstream-side pressure sensor, thereby controlling the flow. Under condi-
(Continued)

tions where no fluid flow occurs in the flow channel, the computation control circuit computes the difference between the detected value of the upstream-side pressure sensor and the detected value of the downstream-side pressure sensor, and outputs a signal for pressure sensor malfunction determination based on the computed difference.

9 Claims, 2 Drawing Sheets

(51) Int. Cl.
　　*G01F 1/00*　　　(2006.01)
　　*G01F 25/00*　　 (2006.01)
　　*G05D 7/06*　　　(2006.01)

(56) References Cited

U.S. PATENT DOCUMENTS

| | | |
|---|---|---|
| 2011/0209560 A1 | 9/2011 | Ito et al. |
| 2014/0083159 A1 | 3/2014 | Nagai |

FOREIGN PATENT DOCUMENTS

| | | |
|---|---|---|
| JP | 2011-199256 A | 10/2011 |
| JP | 2014-063348 A | 4/2014 |

* cited by examiner

PRESSURE-BASED FLOW RATE CONTROL DEVICE AND MALFUNCTION DETECTION METHOD THEREFOR

TECHNICAL FIELD

The present invention relates to a pressure-type flow rate control device for use in semiconductor manufacturing facilities, chemical plants, and the like, and also to a malfunction detection method therefor.

BACKGROUND ART

Conventionally, as shown in FIG. 3, a pressure-type flow rate control device 10 including a flow channel 2 through which a fluid G to be controlled passes, a restriction part 3, such as an orifice, interposed in the flow channel 2, an upstream-side pressure sensor 4 that detects the fluid pressure on the upstream side of the restriction part 3, a downstream-side pressure sensor 5 that detects the fluid pressure on the downstream side of the restriction part 3, a flow control valve 6 provided in the flow channel 2 on the upstream side of the upstream-side pressure sensor 4, and a computation control part 7 that controls the flow control valve 6 is known (Patent Document 1, etc.).

In a pressure-type flow rate control device of this type, a predetermined relationship is established between the detected value of the upstream-side pressure ($P_1$) detected by the upstream-side pressure sensor 4, the detected value of the downstream-side pressure ($P_2$) detected by the downstream-side pressure sensor 5, and the flow Q passing through the restriction part 3. Utilizing this relationship, the computation control part 7 controls the flow control valve 6 based on the detected value of the upstream-side pressure ($P_1$) or on the detected value of the upstream-side pressure ($P_1$) and the detected value of the downstream-side pressure ($P_2$), thereby controlling the flow to a specific flow. For example, under a critical expansion condition where $P_1 \geq$ about $2 \times P_2$ is satisfied, the following relationship is true: the flow $Q=K_1P_1$ ($K_1$=constant). Meanwhile, under a non-critical expansion condition, the following relationship is established: the flow $Qc=KP_2{}^m(P_1-P_2)^n$ (K is a proportionality coefficient depending on the kind of fluid and the fluid temperature, and exponents m and n are values derived by fitting the actual flow using this flow equation). Using these flow calculation equations, the flow can be computed.

In semiconductor manufacturing facilities and the like, as shown in FIG. 4, a plurality of flow channels, each having an on-off valve 8 provided downstream a pressure-type flow rate control device 10, are connected to a process chamber 9, and the process of supplying a fluid to the process chamber 9 is performed while switching the supplied fluid with the on-off valves 8.

CITATION LIST

Patent Literature

Patent Document 1: Japanese Laid-Open Patent Publication No. 2004-138425

SUMMARY OF INVENTION

Technical Problem

In the conventional pressure-type flow rate control device described above, there may be a drift in the controlled flow due to pressure sensor failure or errors in the detected values of the pressure sensors, and thus it has been necessary to check the presence or absence of abnormalities in the pressure sensors at the right time. Conventionally, the controlled flow command is made zero, then the flow channel having the pressure sensors is evacuated, and whether the detected values of the pressure sensors are zero is checked. When the detected values of the pressure sensors are zero, it can be judged that the pressure sensor is normal, and there is no flow error.

However, because the evacuation step is required for such detection of abnormalities in pressure sensors, the detection cannot be performed during the usual fluid supply process and can only be performed in the maintenance mode.

Thus, the main object of the present invention is to provide a pressure-type flow rate control device that allows abnormalities an pressure sensors to be checked without evacuating the flow channel in which the pressure sensors are provided, and also a malfunction detection method for the pressure-type flow rate control device.

Solution to Problem

In order to achieve the above object, an embodiment of the pressure-type flow rate control device according to the present invention includes: a restriction part interposed in flow channel; an upstream-side pressure sensor for detecting a fluid pressure on the upstream side of the restriction part; a downstream-side pressure sensor for detecting a fluid pressure on the downstream side of the restriction part; a flow control valve provided in the flow channel on the upstream side of the upstream-side pressure sensor; and a computation control circuit controlling the flow control valve based on detected values of the upstream-side pressure sensor and the downstream-side pressure sensor, thereby controlling the flow to a set flow. Under conditions where no fluid flows in the flow channel, the computation control circuit computes the difference between the detected value of the upstream-side pressure sensor and the detected value of the downstream-side pressure sensor, and outputs a signal for pressure sensor malfunction determination based on the computed difference.

In one embodiment, under conditions where an on-off valve provided in the flow channel on the downstream side of the downstream-side pressure sensor is closed, and the flow control valve is closed, the computation control circuit computes the difference between the detected value of the upstream-side pressure sensor and the detected value of the downstream-side pressure sensor, and outputs a signal for pressure sensor malfunction determination based on the computed difference.

In one embodiment, the upstream-side pressure sensor and the downstream-side pressure sensor have the same rated pressure, and the computation control circuit outputs the percentage of the difference between the detected value of the upstream-side pressure sensor and the detected value of the downstream-side pressure sensor relative to the rated pressure as the signal for pressure sensor malfunction determination.

In one embodiment, the computation control circuit outputs the signal for pressure sensor malfunction determination as a flow rate output.

In one embodiment, the pressure-type flow rate control device further includes a malfunction determination means determining abnormalities in the upstream-side pressure sensor and the downstream-side pressure sensor using the signal for pressure sensor malfunction determination.

In addition, in order to achieve the above object, an embodiment of the malfunction detection method for a pressure-type flow rate control device according to the present invention is as follows. The pressure-type flow rate control device includes: a restriction part interposed in a flow channel; an upstream-side pressure sensor for detecting a fluid pressure on the upstream side of the restriction part; a downstream-side pressure sensor for detecting a fluid pressure on the downstream side of the restriction part; a flow control valve provided in the flow channel on the upstream side of the upstream-side pressure sensor; and a computation control circuit controlling the flow control valve based on detected values of the upstream-side pressure sensor and the downstream-side pressure sensor, thereby controlling the flow to a set flow. The malfunction detection method includes: a step of, under conditions where no fluid flows in the flow channel, detecting the pressure in the flow channel by the upstream-side pressure sensor and the downstream-side pressure sensor; a step of computing the difference between the detected value of the upstream-side pressure sensor and the detected value of the downstream-side pressure sensor; and a step of outputting a signal for pressure sensor malfunction determination based on the difference obtained by computation.

In one embodiment of the malfunction detection method for a pressure-type flow rate control device according to the present invention, it is possible that the conditions where no fluid flows in the flow channel includes a condition where an on-off valve provided in the flow channel on the downstream side of the downstream-side pressure sensor is closed, the set, flow is set to zero, and the flow control valve as closed.

In one embodiment of the malfunction detection method for a pressure-type flow rate control device according to the present invention, it is possible that the method further includes a step of outputting the percentage of the difference between the detected value of the upstream-side pressure sensor and the detected value of the downstream-side pressure sensor relative to the same rated pressure of the upstream-side pressure sensor and the downstream-side pressure sensor as the signal for pressure sensor malfunction determination.

In one embodiment of the malfunction detection method for a pressure-type flow rate control device according to the present invention, it is possible that the signal for pressure sensor malfunction determination is output as a flow rate output.

In one embodiment of the malfunction detection method for a pressure-type flow rate control device according to the present invention, it is possible that the method further includes a step of comparing the signal for pressure sensor malfunction determination with a predetermined threshold, thereby determining the presence of abnormalities in one or both of the upstream-side pressure sensor and the downstream-side pressure sensor.

Advantageous Effects of Invention

According to the present invention, under conditions where no fluid flows in the flow channel, the upstream-side pressure sensor and the downstream-side pressure sensor, when under normal operation, should output the same detected value, and accordingly the difference between the detected value of the upstream-side pressure sensor and the detected value of the downstream-side pressure sensor should be zero. Meanwhile, in the case where there is a difference in detected value between the upstream-side pressure sensor and the downstream-side pressure sensor, there is a possibility that one or both of them have errors or are faulty. Depending on the degree of difference in detected value between the upstream-side pressure sensor and the downstream-side pressure sensor, it can be determined that abnormalities are present in the controlled flow of the pressure-type flow rate control device.

In one aspect of the present invention, when the on-off valve on the downstream side of the restriction part is closed after the completion of a process, the set flow is set to zero, and the flow control valve on the upstream side of the restriction part is closed, the gas does not flow but remains in the flow channel between the flow control valve and the on/off valve. Under such conditions, the pressure of the remaining gas is simultaneously detected by the upstream-side pressure sensor and the downstream-side pressure sensor. The upstream-side pressure sensor and the downstream-side pressure sensor measure the gas pressure in the closed flow channel. Therefore, when under normal operation, they should output the same detected value, and accordingly the difference between the detected value of the upstream-side pressure sensor and the detected value of the downstream-side pressure sensor should be zero. Meanwhile, in the case where there is a difference in detected value between the upstream-side pressure sensor and the downstream-side pressure sensor, there is a possibility that one or both of them have errors or are faulty. Accordingly, without evacuating the flow channel, by obtaining the difference between the detected value of the upstream-side pressure sensor and the detected value of the downstream-side pressure sensor, and judging the degree of difference, whether any of the upstream-side pressure sensor and the downstream-side pressure sensor is faulty or has a detection error can be checked, and abnormalities in the upstream-side pressure sensor and the downstream-side pressure sensor, that is, abnormalities in the controlled flow, can be detected. This malfunction detection for pressure sensors does not require an evacuation step and thus can be performed during a fluid supply process when the on-off valve on the downstream side is closed.

In addition, in another aspect of the present invention, the percentage of the difference between the detected value of the upstream-side pressure sensor and the detected value of the downstream-side pressure sensor relative to the rated pressure of the pressure sensors is output as the signal for pressure sensor malfunction determination. As a result, in the case where there is an error in the upstream-side pressure sensor and the downstream-side pressure sensor, the error percentage can be known, and also by comparing the error percentage with a predetermined threshold, whether there are abnormalities can be determined.

DESCRIPTION OF EMBODIMENTS

Some embodiments of the pressure-type flow rate control device according to the present invention will be described hereinafter with reference to FIG. 1 and FIG. 2. Including the prior art, identical or similar components are indicated with same reference signs.

Figure 1:
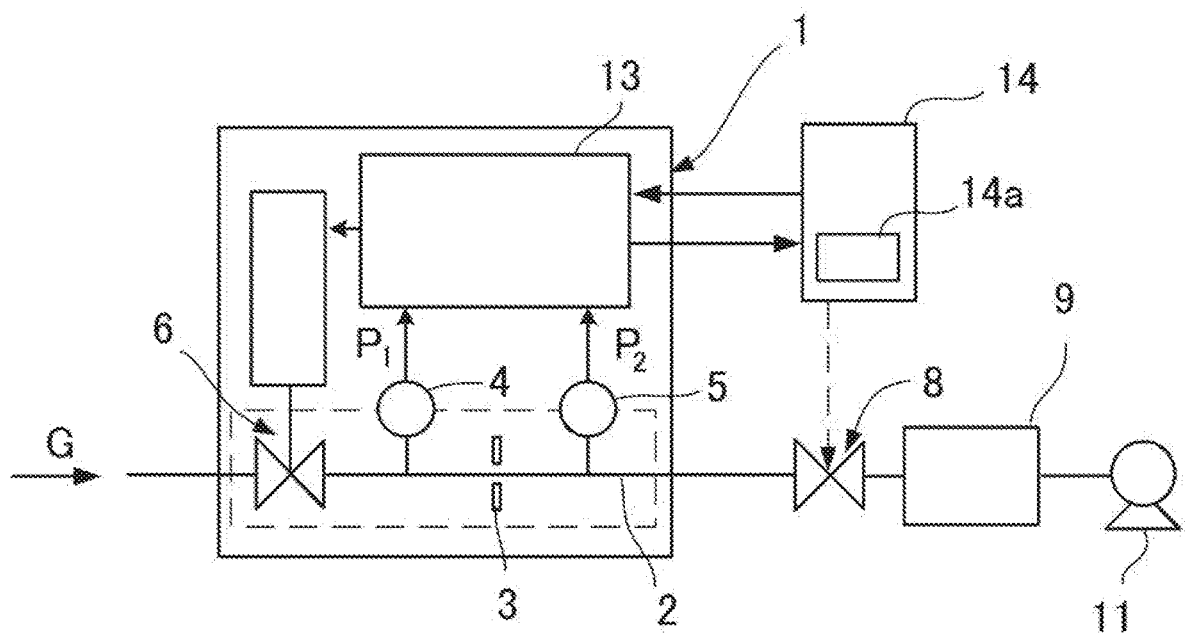
[FIG. 1] A schematic block diagram showing one embodiment of the pressure-type flow rate control device of the present invention.
Figure 2:
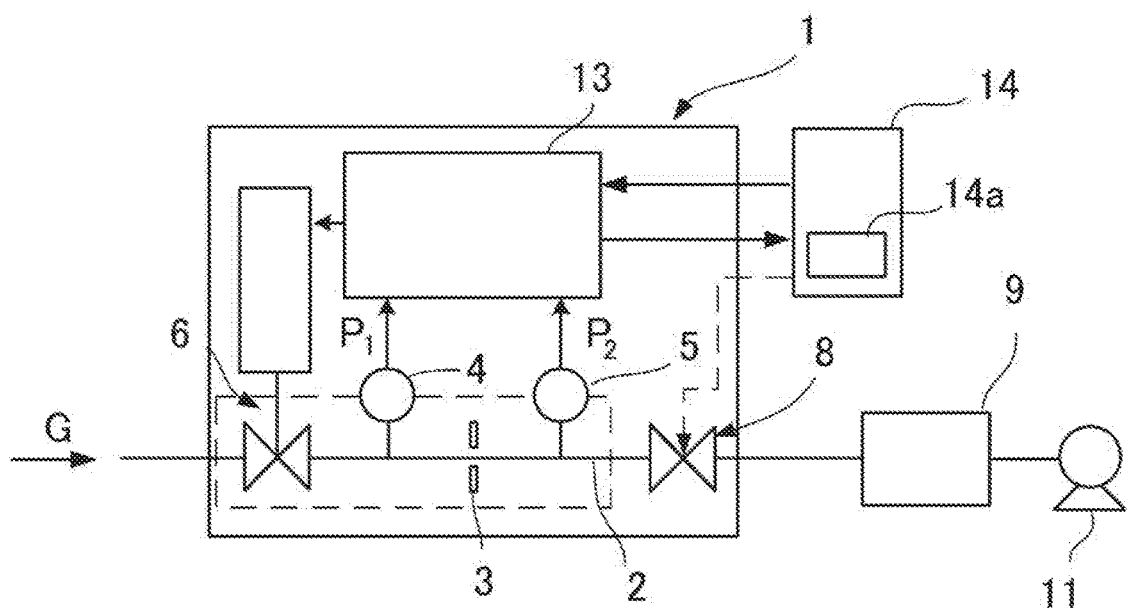
[FIG. 2] A schematic block diagram showing another embodiment of the pressure-type flow rate control device of the present invention.
Figure 3:
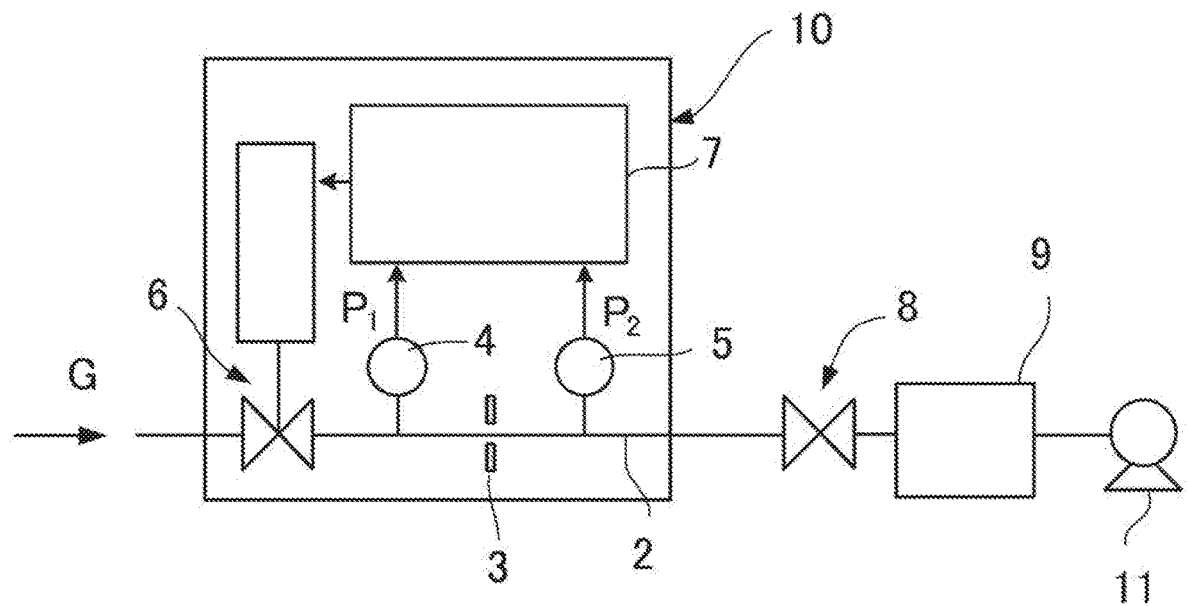
[FIG. 3] A schematic block diagram showing a conventional pressure-type flow rate control device.

FIG. 1 is a schematic block diagram showing one embodiment of the pressure-type flow rate control device. The pressure-type flow rate control device 1 includes: a restriction part interposed in a flow channel 2; an upstream-side pressure sensor 4 for detecting a fluid pressure on the upstream side of the restriction part 3; a downstream-side pressure sensor for detecting a fluid pressure on the downstream side of the restriction part 3; a flow control valve 6 provided in the flow channel on the upstream side of the upstream-side pressure sensor 4; and a computation control circuit 13 controlling the flow control valve 6 based on detected values of the upstream-side pressure sensor 4 and the downstream-side pressure sensor 5, thereby controlling the flow. Although not shown in the figure, a temperature sensor that detects the fluid temperature in the flow channel 2 may be disposed between the upstream-side pressure sensor 4 and the restriction part 3, for example.

The flow channel 2 may be formed by drilling a hole into a metallic block or the like. The restriction part 3 is formed of a thin orifice plate interposed in the flow channel 2. As the upstream-side pressure sensor 4 and the downstream-side pressure sensor 5, for example, pressure sensors incorporating a silicon monocrystalline sensor chip and a diaphragm may be used. It is preferable that the upstream-side pressure sensor and the downstream-side pressure sensor 5 have the same rated pressure and the same specification. As the flow control valve 6, a piezoelectric-element-actuated metallic diaphragm valve is used.

An on-off valve 8 is provided in the flow channel on the downstream side of the downstream-side pressure sensor 5. In the example shown in FIG. 1, the on-off valve 8 is connected outside of the pressure-type flow rate control device 1. However, in another variation, as shown in FIG. 2, the on-off valve 8 may be incorporated in the pressure-type flow rate control device 1. As the on-off valve 6, an air-operated valve is used, for example. The supply of actuation air is ON/OFF-controlled by an electromagnetic valve or the like, whereby opening and closing of the on-off valve 8 can be controlled.

A set flow rate is set in an external controller 14, and the signal of the set flow rate is sent from the external controller 14 to the computation control circuit 13. Based on the detected values of the upstream-side pressure sensor 4 and the downstream-side pressure sensor 5, the computation control circuit 13 computes the flow rate using the flow calculation equation under a critical expansion condition or a non-critical expansion condition, and controls the flow control valve 6 so that the flow rate of the fluid passing through the restriction part 3 will be the set flow rate. The computation control circuit 13 may output the computed flow as a flow rate output ($Q_{out}$) to the external controller 14. The flow rate output ($Q_{out}$) received by the external controller 14 may be displayed on a display 14a, whereby the flow obtained by computation can be monitored.

The pressure-type flow rate control device 1 is installed in a flow channel, such as a gas supply line of a semiconductor manufacturing line. In a semiconductor manufacturing line, a plurality of flow channels are connected to a process chamber 9 (see FIG. 4), and the pressure-type flow rate control device 1 is provided in each of the flow channels. By switching the on-off valve 8 provided in the respective flow channels, different kinds of process gases with the controlled flow rate are successively supplied to the process chamber 9. While a process gas is supplied to the process chamber 9, the inside of the process chamber 9 is evacuated by a vacuum pump 11. After the completion of one process, in order to stop the gas supply, the on-off valve 8 is closed by a command from the external controller 14. Then, together with that, a signal to make the controlled flow of the flow control valve 6 zero is sent from the external controller 14 to the computation control circuit 13, resulting in a so-called zero-flow mode. In the zero-flow mode, in response to the signal of the set flow=zero, the computation control circuit 13 closes the flow control valve 6. As a result, the gas remains in the flow channel 2 between the flow control valve 6 and the on-off valve 8. Incidentally, as the on-off valve 8, in order to completely stop the gas supply to the process chamber 9, a valve having less leakage and a stronger valve-closing force than the flow control valve 6 may be used.

In the zero-flow mode, the computation control circuit 13 computes the difference ($P_1-P_2$) between the detected value of the upstream-side pressure sensor 4 ($P_1$) and the detected value of the downstream-side pressure sensor 5 ($P_2$).

The upstream-side pressure sensor 4 and the downstream-side pressure sensor 5 measure the same gas pressure in the flow channel 2 with both ends closed. Therefore, the upstream-side pressure sensor and the downstream-side pressure sensor 5, when under normal operation, should output the same detected value, and accordingly the difference ($P_1-P_2$) between the detected value of the upstream-side pressure sensor and the detected value of the downstream-side pressure sensor should be zero.

Meanwhile, in the case where the difference ($P_1-P_2$) between the detected value of the upstream-side pressure sensor 4 ($P_1$) and the detected value of the downstream-side pressure sensor 5 ($P_2$) is not zero, depending on the degree of difference, it is likely that one or both of the upstream-side pressure sensor 4 and the downstream-side pressure sensor 5 have errors or are faulty.

Accordingly, by computing the difference between the detected value of the upstream-side pressure sensor 4 and the detected value of the downstream-side pressure sensor 5, and determining the degree of difference, without evacuating the flow channel 2, it can be checked whether any of the upstream-side pressure sensor 4 and the downstream-side pressure sensor 5 is faulty or has errors.

Figure 4:
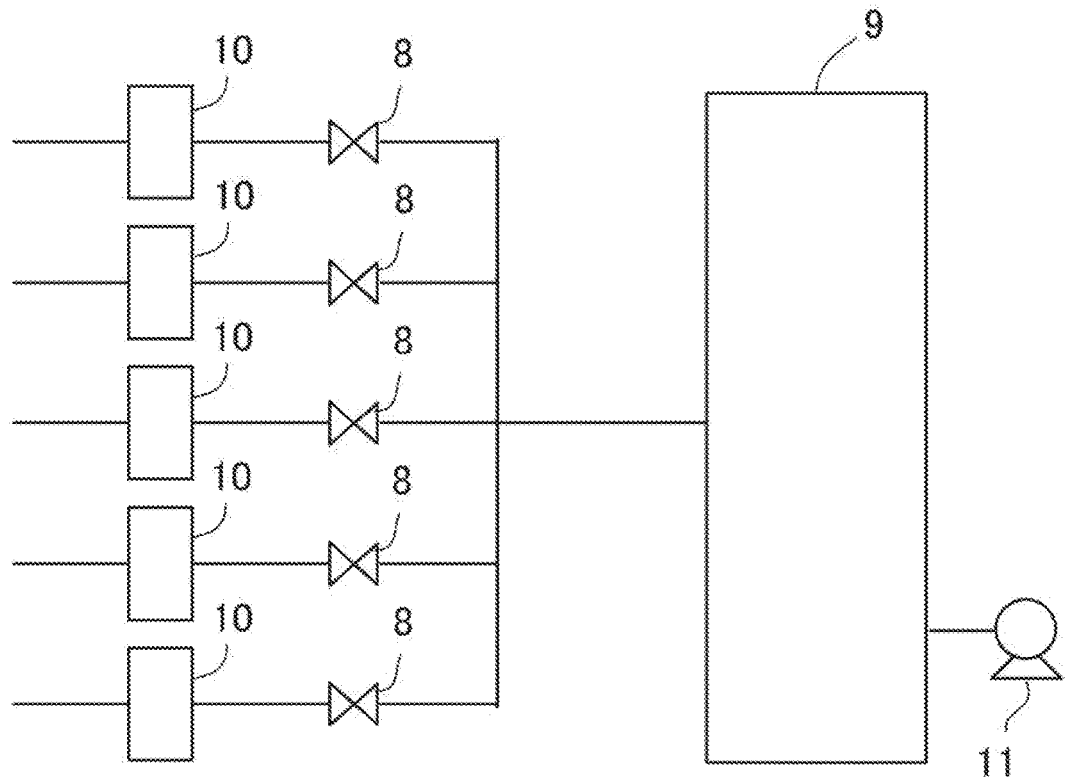
[FIG. 4] A schematic block diagram showing an example of the connection of a conventional pressure-type flow rate control device to a process chamber.

In particular, in the case where a plurality of flow channels are connected to the process chamber 9 as shown in FIG. 4, and the on-off valve 8 is closed in the zero-flow mode in one flow channel, while the on-off valve 8 is opened and a gas flows at a specific flow rate in another flow channel, whether there are abnormalities in the upstream-side pressure sensor 4 and the downstream-side pressure sensor 5 in the pressure-type flow rate control device 1 in the zero-flow mode can be detected while leaving the gas flowing in the gas-flowing flow channel.

The computation control circuit 13 outputs the difference in detected value ($P_1-P_2$) as a signal for pressure sensor malfunction determination to the external controller device 14, and the external controller 14 may include a malfunction determination means that compares the difference in detected value ($P_1-P_2$), which is the signal for pressure sensor malfunction determination, with a predetermined threshold, thereby determining the presence or absence of abnormalities. For example, in the case where the absolute value of the difference in detected value ($P_1-P_2$), which is the signal for pressure sensor malfunction determination, exceeds the threshold, the external controller 14 determines that abnormalities are present. The results of determination by the malfunction determination means may be displayed on the display 14a, for example, whereby the time to change the pressure sensors can be indicated.

In addition, in another embodiment, the computation control circuit 13 may output the percentage of the difference ($P_1-P_2$) between the detected value of the upstream-side pressure sensor 4 ($P_1$) and the detected value of the downstream-side pressure sensor ($P_2$) relative to the rated pressure of the upstream-side pressure sensor 4 and the downstream-side pressure sensor 5 ($P_{max}$), or $[((P_1-P_2)/P_{max})\times100](\%)$, as signal for pressure sensor malfunction determination, and the signal may be displayed on the display 14a or the like, for example.

In this case, the computation control circuit 13 may output the signal for pressure sensor malfunction determination $[((P_1-P_2)/P_{max})\times100](\%)$ as a flow rate output ($Q_{out}$) to the external controller 14. The external controller 14 can determine the drift of the flow rate output ($Q_{out}$) from the set flow of zero as the zero-point drift from the set flow=zero, and thus may include a malfunction determination means that determines the presence of abnormalities in the pressure sensors in the case where the drift width of the zero-point drift exceeds a predetermined threshold. In addition, by adjusting the drift, zero-point adjustment is also possible.

The present invention is not limited to the above embodiments, and various modifications can be made without deviating from the gist the present invention. For example, the flow control valve may also be a solenoid-actuated type in place of the piezoelectric-element-actuated type.

In addition, although malfunction detection under conditions where the flow control valve 6 is closed in the zero-flow mode has been described in the above embodiments, even under conditions where the flow control valve is not closed, when no fluid flows in the flow channel 2 in the pressure-type flow rate control device 1, such as when the on-off valve (not shown) connected upstream the pressure-type flow rate control device 1 is closed, for example, the presence or absence of abnormalities in the upstream-side pressure sensor and the downstream-side pressure sensor can be detected as in the above embodiments.

REFERENCE SIGNS LIST

1: Pressure-type flow rate control device
2: Flow channel
3: Restriction part
4: Upstream-side pressure sensor
5: Downstream-side pressure sensor
6: Flow control valve
8: On-off valve
13: Computation control circuit

The invention claimed is:

1. A gas flow system comprising a plurality of pressure-type flow rate control devices, each pressure-type flow rate control device comprising:
a restriction part interposed in a gas flow channel;
an upstream-side pressure sensor for detecting a gas pressure on an upstream side of the restriction part;
a downstream-side pressure sensor for detecting a gas pressure on a downstream side of the restriction part;
a flow control valve provided in the gas flow channel on an upstream side of the upstream-side pressure sensor; and
a computation control circuit controlling the flow control valve based on detected values of the upstream-side pressure sensor and the downstream-side pressure sensor, thereby controlling a flow rate to a set flow rate,
wherein a first pressure-type flow rate control device is provided to a first flow line and a second pressure-type flow rate control device is provided to a second flow line, the first flow line and the second flow line being connected to a same process chamber,
when an on-off valve provided on a downstream side of the downstream-side pressure sensor and the flow control valve in the first flow line are closed, and no gas flow occurs in the first flow line while gas is supplied through the second flow line to the process chamber, the computation control circuit of the first pressure type flow rate control device computes a difference between a detected value of the upstream-side pressure sensor and a detected value of the downstream-side pressure sensor, and outputs a signal for pressure sensor malfunction determination based on the computed difference.

2. The gas flow system according to claim 1, wherein the upstream-side pressure sensor and the downstream-side pressure sensor of the first pressure-type flow rate control device have the same rated pressure, and the computation control circuit of the first pressure-type flow rate control device outputs the percentage of the difference between the detected value of the upstream-side pressure sensor and the detected value of the downstream-side pressure sensor relative to the rated pressure as the signal for pressure sensor malfunction determination.

3. The gas flow system according to claim 2, wherein the computation control circuit of the first pressure-type flow rate control device outputs the signal for pressure sensor malfunction determination as a flow rate output.

4. The gas flow system according to claim 1, the first pressure-type flow rate control device further comprising a malfunction determination circuit determining abnormalities in the upstream-side pressure sensor and the downstream-side pressure sensor using the signal for pressure sensor malfunction determination.

5. A malfunction detection method for a pressure-type flow rate control device of a gas flow system comprising a plurality of pressure-type flow rate control devices, each pressure-type flow rate control device comprising:
a restriction part interposed in a gas flow channel;
an upstream-side pressure sensor for detecting a gas pressure on an upstream side of the restriction part;
a downstream-side pressure sensor for detecting a gas pressure on a downstream side of the restriction part;
a flow control valve provided in the gas flow channel on an upstream side of the upstream-side pressure sensor; and
a computation control circuit controlling the flow control valve based on detected values of the upstream-side pressure sensor and the downstream-side pressure sensor, thereby controlling a flow rate to a set flow rate,
a first pressure-type flow rate control device being provided to a first flow line and a second pressure-type flow rate control device being provided to a second flow line, the first flow line and the second flow line being connected to a same process chamber,
the malfunction detection method comprising:
a step of, when an on-off valve provided on a downstream side of the downstream-side pressure sensor and the flow control valve in the first flow line are closed, and no gas flow occurs in the first flow line while gas is supplied through the second flow line to the process chamber, by the computation control circuit of the first pressure-type flow rate control device, computing a difference between a detected value of the upstream-side pressure sensor and a detected value of the downstream-side pressure sensor and outputting a signal for pressure sensor malfunction determination based on the difference obtained by computation.

6. The malfunction detection method for a pressure-type flow rate control device according to claim 5, wherein the on-off valve provided on the downstream side of the downstream-side pressure sensor and the flow control valve in the first flow line are closed by setting the set flow rate to zero.

7. The malfunction detection method for a pressure-type flow rate control device according to claim 5, further comprising a step of outputting, by the computation control circuit of the first pressure-type flow rate control device, a percentage of the difference between the detected value of the upstream-side pressure sensor and the detected value of the downstream-side pressure sensor relative to the same rated pressure of the upstream-side pressure sensor and the downstream-side pressure sensor as the signal for pressure sensor malfunction determination.

8. The malfunction detection method for a pressure-type flow rate control device according to claim 7, wherein the signal for pressure sensor malfunction determination is output as a flow rate output.

9. The malfunction detection method for a pressure-type flow rate control device according to claim 5, further comprising a step of comparing the signal for pressure sensor malfunction determination with a predetermined threshold, thereby determining a presence of abnormalities in one or both of the upstream-side pressure sensor and the downstream-side pressure sensor.

* * * * *